Nov. 28, 1944. E. J. SVENSON 2,363,706
HYDRAULIC ACTUATOR AND CONTROL SYSTEM
Original Filed Nov. 7, 1930  6 Sheets-Sheet 1
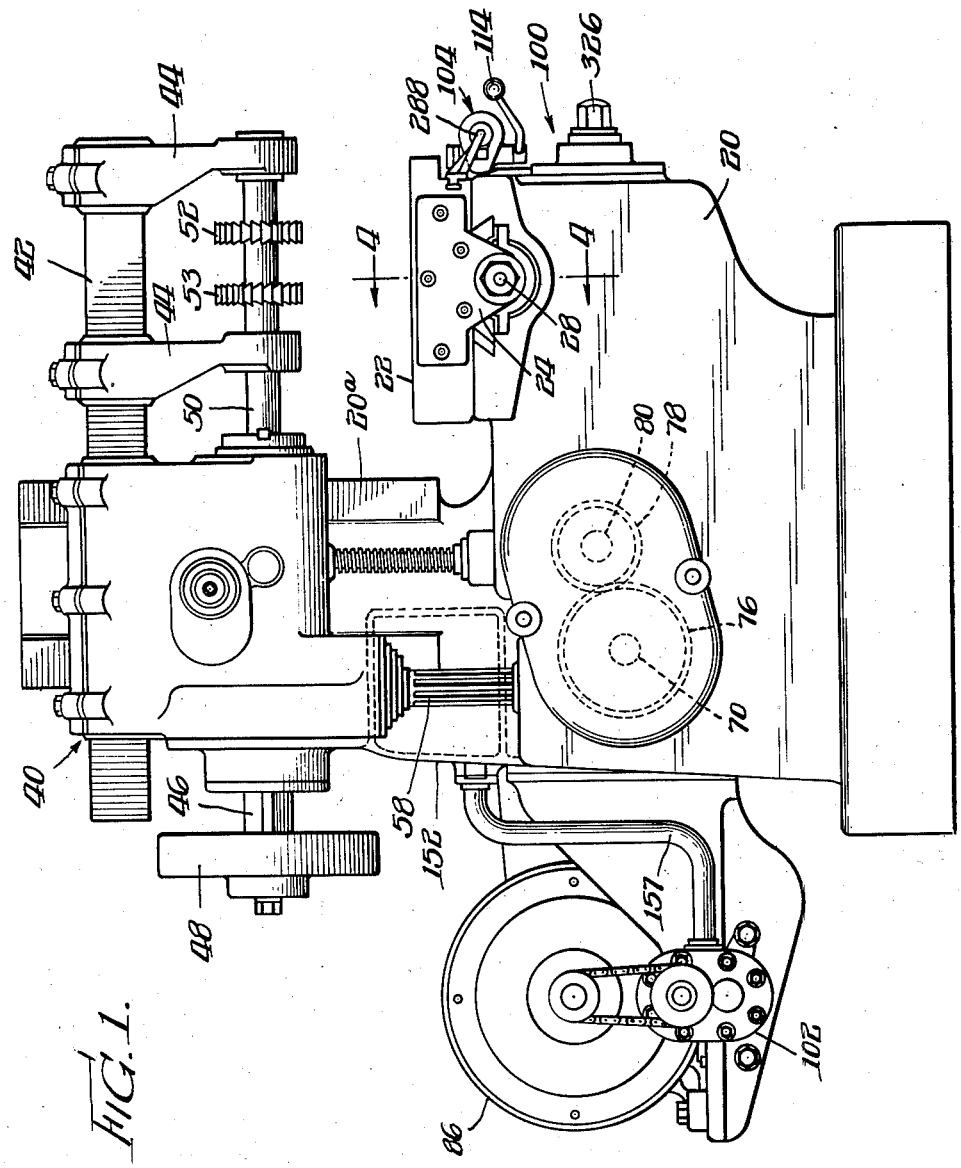
Inventor:
Ernest J. Svenson
By:- Cox & Moore attys.

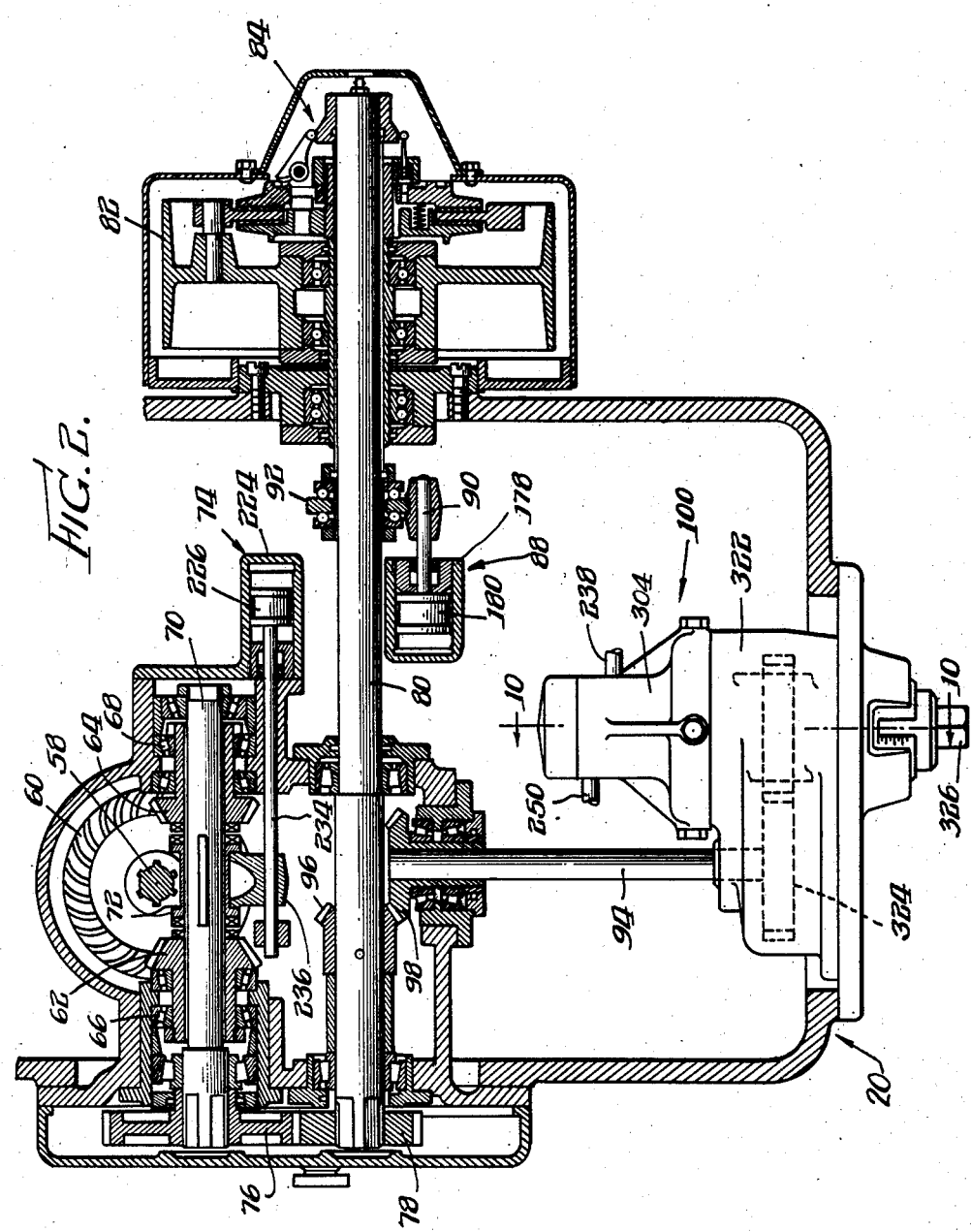

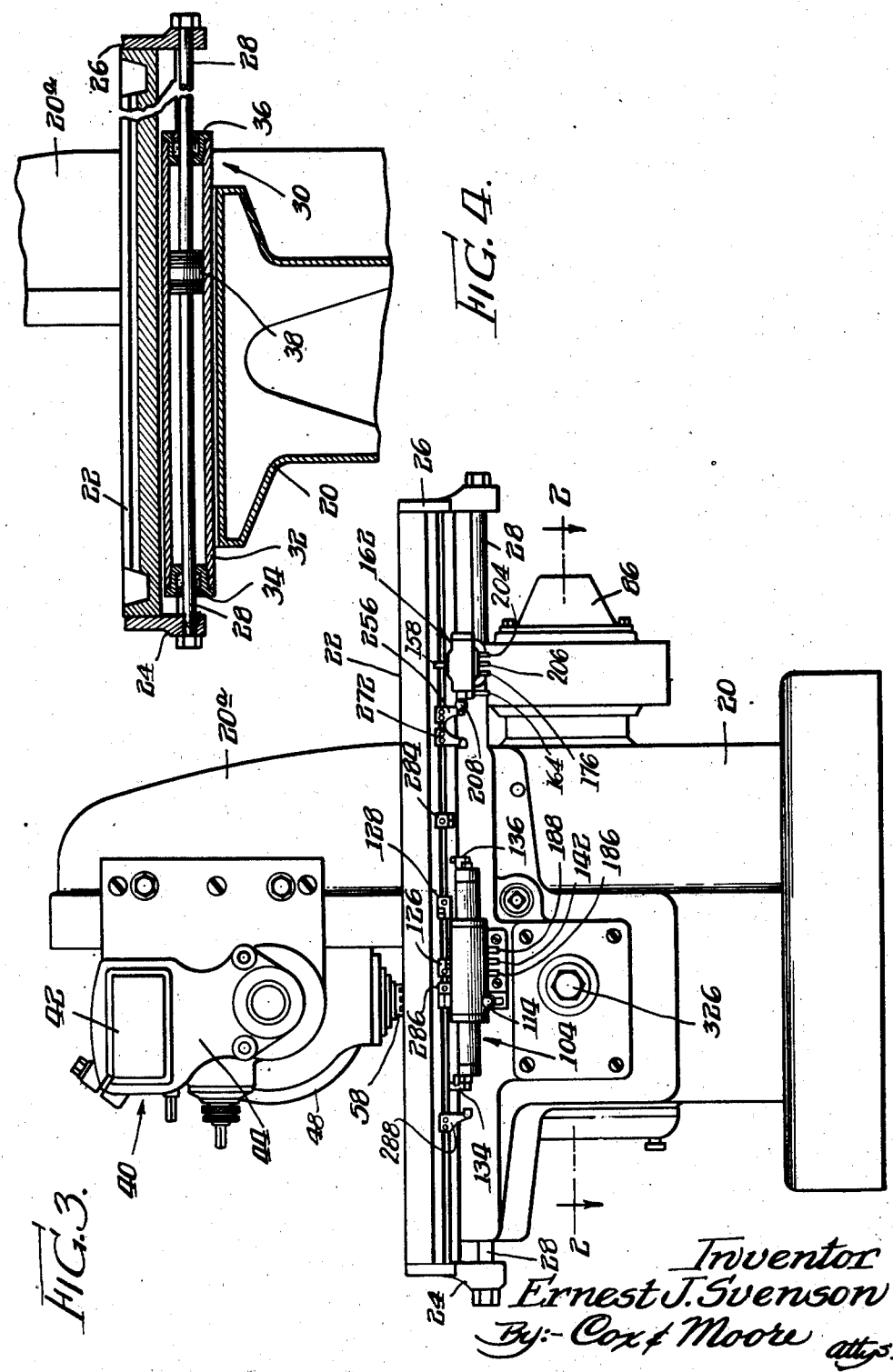

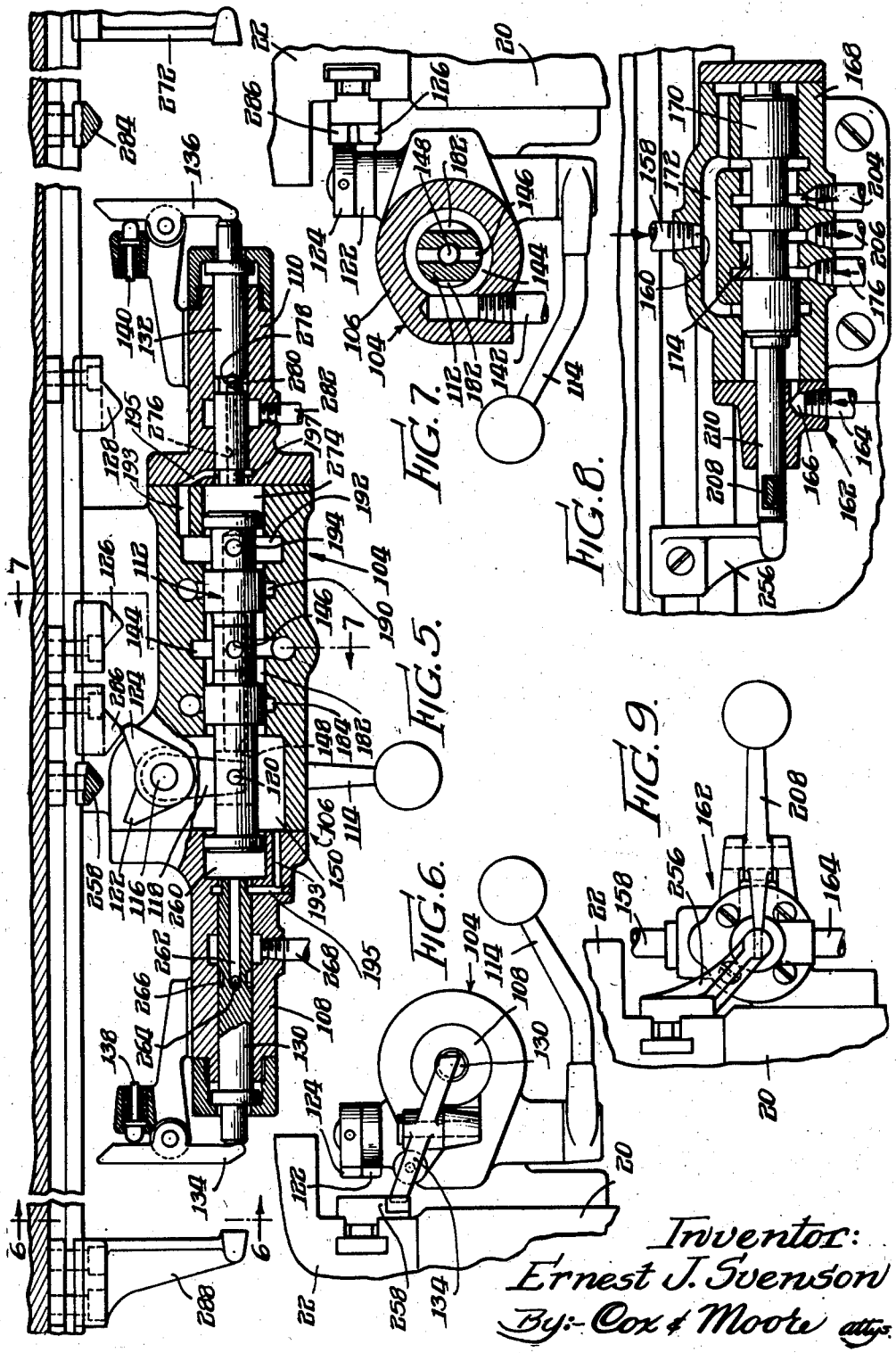

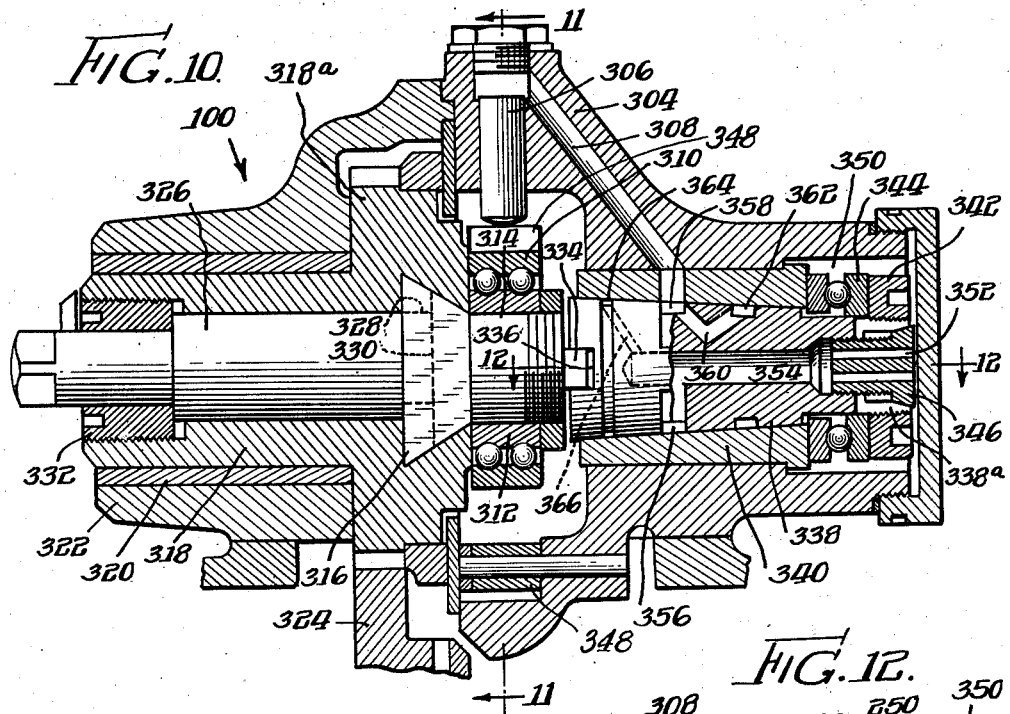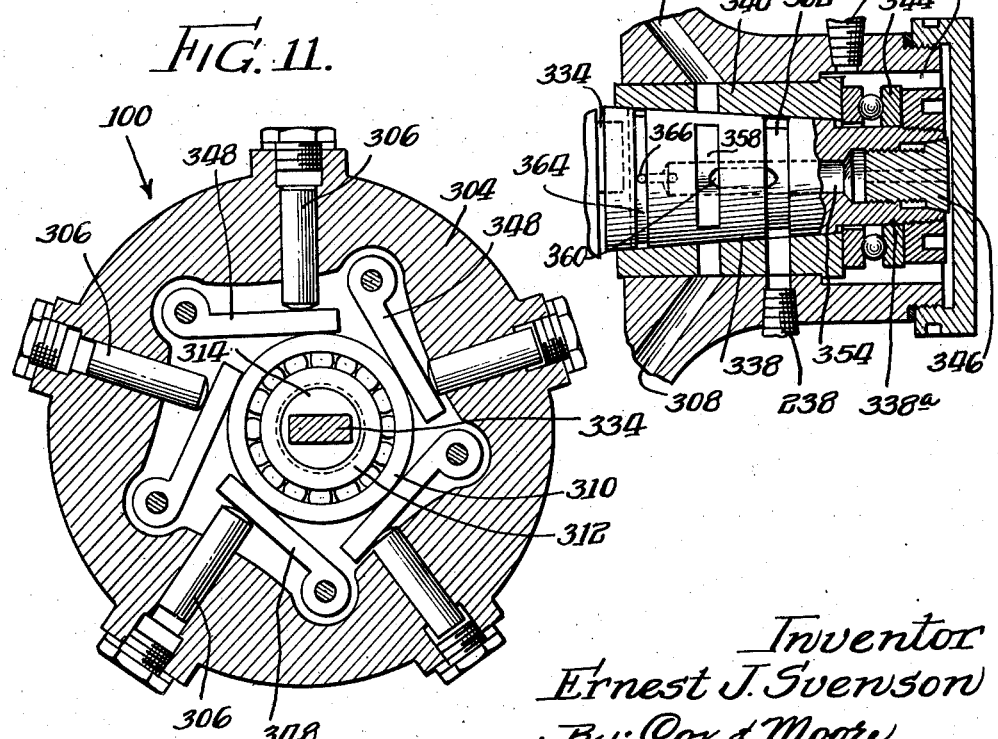

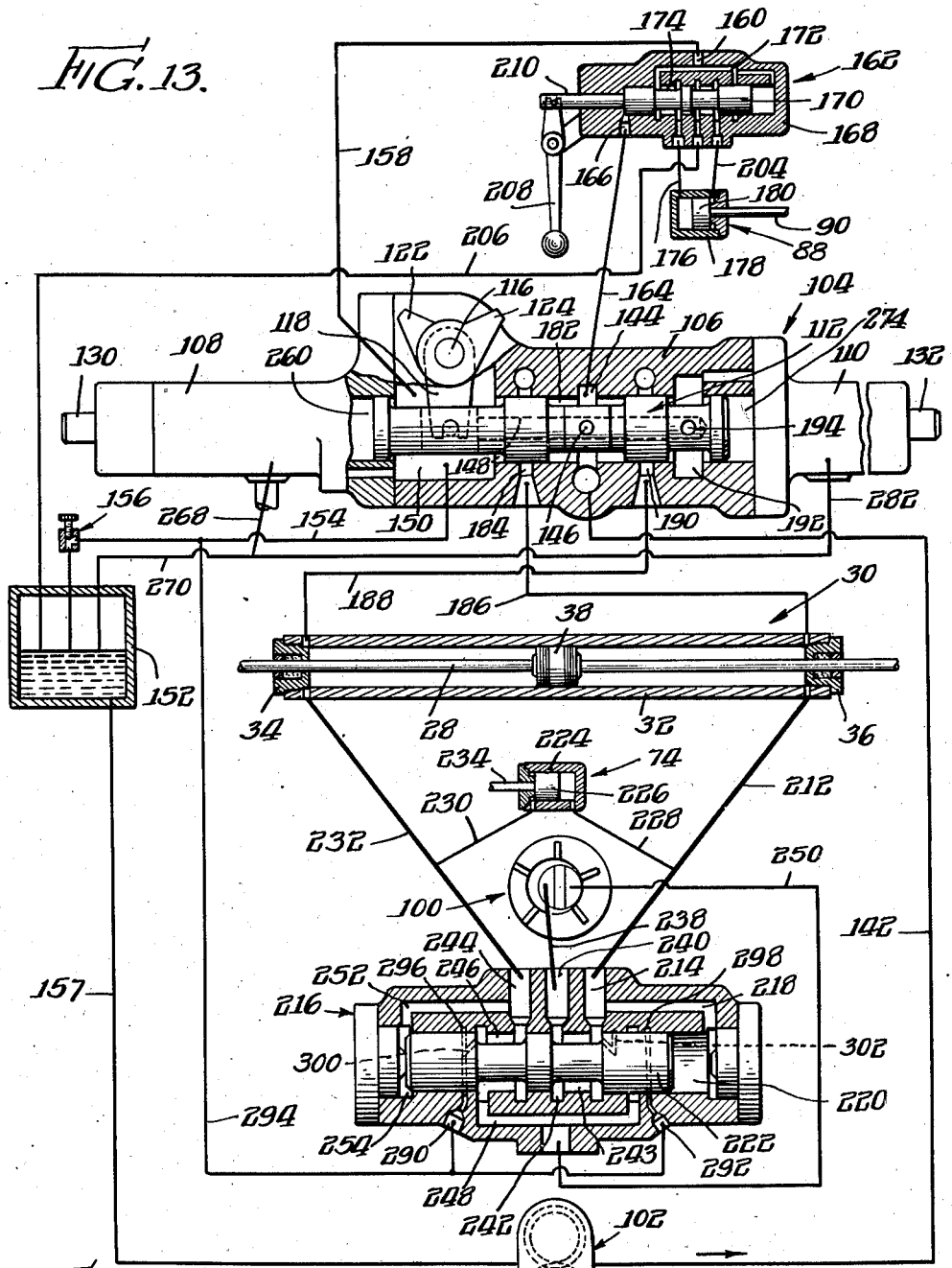

Patented Nov. 28, 1944

2,363,706

UNITED STATES PATENT OFFICE 2,363,706

HYDRAULIC ACTUATOR AND CONTROL SYSTEM

Ernest J. Svenson, Rockford, Ill., assignor, by mesne assignments, to Odin Corporation, Chicago, Ill., a corporation of Illinois Original application November 7, 1930, Serial No. 494,045, now Patent No. 2,099,776, dated November 23, 1937. Divided and this application November 22, 1937, Serial No. 175,833

22 Claims. (Cl. 60—52)

My invention relates generally to hydraulic systems of actuation and control, and more particularly to hydraulic systems for actuating and controlling the movement of supporting elements of machines, such as a reversible spindle and a reciprocable carriage.

The present invention is a division of my copending application, Serial No. 494,045, filed November 7, 1930, which has since matured into Patent No. 2,099,776. The present invention is directed to hydraulic systems of actuation and control per se, as distinguished from my above mentioned copending application, wherein the machine tool proper and hydraulic system of actuation therefor have been described and claimed.

Difficulties which have been encountered heretofore by manufacturers of material working apparatus, such as milling machines and the like, have been frequently attributable to the type of transmission and control mechanism with which the machine is equipped. For example, stuttering and non-uniform movement of hydraulically shiftable parts has been encountered because of inadequate systems of hydraulic actuation and control. Overheating of the fluid propelling medium, such as oil, in the use of other conventional hydraulic actuator systems has been experienced, with the result that the operating efficiency has been materially impaired.

It is one of the primary objects of my present invention to overcome many of the disadvantages which have been experienced heretofore with mechanical as well as hydraulically controlled apparatus, and to this end I propose to provide a hydraulic system of actuation and control, which is extremely simple in arrangement, positive in operation, and adapted to afford continued service over an extended period of time without requiring adjustment, repair, or replacement.

More specifically, my invention contemplates the provision of a hydraulic system of control, which is adapted to effect rapid traverse and feeding movements of a machine element at predetermined intervals.

A further object of my invention is to provide a hydraulic actuator system for reciprocating a machine part, by means of which said machine part may be subjected to rapid traverse and feeding movement in opposite directions, and said movements may be automatically controlled within very close operating limits, that is to say, my invention contemplates the instantaneous shifting from one rate or direction of movement to another without subjecting the controlling circuits to any disturbing effects which tend to impair the operating efficiency of the machine.

It is another object of my invention to provide, in combination with an actuator system including a feeding circuit and a rapid traverse circuit, improved means responsive to the flow of fluid in the rapid traverse circuit to control the rate and direction of flow of fluid in the feeding circuit, and to this end I propose to provide a simple valve arrangement which is shiftable in response to fluid pressure from the rapid traverse circuit, and this valve arrangement is connected with the high pressure or feeding circuit, and serves to direct fluid from said circuit to a hydraulic actuator.

Still another object of my invention is to provide a hydraulic system of control, as above set forth, in which the flow of fluid in a feeding or high pressure circuit may be selectively controlled in response to the flow of fluid in a secondary or low pressure circuit.

Still another object of my invention is to provide a hydraulic system of control, as above set forth, in which a feeding or high pressure circuit and a rapid traverse or low pressure circuit are so arranged and coupled with an actuator piston that means, such as a selector valve, will be operable in response to the action of the fluid in the low pressure or rapid traverse circuit, to automatically select the proper sides of the feeding or high pressure circuit, and in this manner selectively control the direction of fluid from the high pressure circuit to said hydraulic actuator.

The foregoing and numerous other objects and advantages will be more apparent from the following detailed description when considered in connection with the accompanying drawings, wherein—

Figure 1 is a side elevational view of a milling machine equipped with a hydraulic system of control which is representative of one embodiment of my invention;

Figure 2 is a horizontal sectional view taken substantially along the line 2—2 of Figure 3, disclosing the general arrangement of the driving elements, with the feed pump shown in elevation;

Figure 3 is a front elevational view of the machine, as viewed from the right of Figure 1;

Figure 4 is a fragmentary vertical sectional view taken centrally and longitudinally of the hydraulic actuator for the milling machine table, said view being taken substantially along the line 4—4 of Figure 1;

Figure 5 is an enlarged central sectional view of the main control valve, said valve being shown in operative association with the milling machine table;

Figure 6 is an end view of the main control valve, as viewed from the left of Figure 5, substantially along the line 6—6;

Figure 7 is a transverse vertical sectional view of the main control valve taken substantially along the line 7—7 of Figure 5;

Figure 8 is an enlarged detail sectional view of the automatically operable valve for controlling the starting and stopping of the machine spindle;

Figure 9 is an end elevational view taken from the left end of the valve shown in Figure 8;

Figure 10 is an enlarged transverse sectional view of the variable displacement or feed pump, said view being taken substantially along the line 10—10 of Figure 2;

Figure 11 is a transverse sectional view of said pump taken substantially along the line 11—11 of Figure 10;

Figure 12 is a fragmentary central sectional view of the tapered valve arrangement and is taken along the line 12—12 of Figure 10;

Figure 13 is a semi-diagrammatic view disclosing the circuit arrangements of my improved hydraulic system of control; and Figure 14 is a diagrammatic representation disclosing a cycle of operation capable of being performed by the use of my invention.

Although the present invention is directed solely to systems of hydraulic actuation and control, I believe it advisable to describe the same in connection with a machine tool, such as a milling machine. In accordance with the general features of the invention, I propose to employ a hydraulic actuator system for automatically or manually controlling the feeding and rapid traverse movements of the milling machine table. A high displacement low pressure pump, such as a gear pump, is employed to deliver fluid for rapid traverse purposes to an actuator cylinder equipped with a reciprocable piston which is connected to the milling machine table. A low displacement high pressure pump, such as a variable displacement plunger pump, is employed to deliver fluid to the actuator cylinder for imparting feeding movement to the table. A main control valve of the three-position type, which may be manually shifted or which may be shifted by dogs associated with the table, serves to control the direction of delivery of low pressure fluid for rapid traverse purposes to the actuator cylinder, and also serves when in its neutral position, to render the low pressure circuit functionally inoperative. Another shiftable valve which might be termed an automatic direction control valve, is connected with the high pressure variable displacement pump, and is shiftable in response to the flow or pressure of the low pressure fluid. Thus, when the actuator is subjected to rapid traverse in a given direction by the low pressure fluid in response to the shifting of the main control valve, the direction control valve is simultaneously shifted and is thereby conditioned to direct high pressure fluid to the actuator in the same direction as the low pressure fluid. In other words, said direction control valve is operable in response to the flow of fluid in the rapid traverse or low pressure circuit to selectively connect the high pressure circuit with the intake side of the actuator cylinder. At this point it should be noted that, when the main control valve is shifted to effect rapid traverse of the table actuator, a clutch control valve is shifted in response to fluid pressure in the rapid traverse circuit, and in this shifted position the valve causes a hydraulic actuator to effect the disengagement of a clutch mechanism connected with the main drive. Thus it will be clear that the milling machine spindle is stationary during the rapid traverse in either direction of the table. A second hydraulic clutch actuator is employed to control the direction of rotation imparted to the milling machine spindle. When the main control valve is automatically or manually shifted to its neutral position, the rapid traverse or low pressure circuit is rendered functionally inoperative for propelling purposes, and the clutch mechanism on the main drive causes power to be transmitted to a main drive shaft of the milling machine, and the other clutch mechanism, which might be termed a reversing clutch, causes rotation to be imparted to the spindle in a direction corresponding to the direction of travel of the table. By a suitable arrangement I am able to control the intermittent rapid traverse and feeding movements of the table in either direction in a very expeditious manner, the milling cutter being rendered non-rotatable during the rapid traverse movements, and its rotation being always in accordance with the direction of movement of the milling machine table.

Machine structure

Having given a general description to the mechanism shown in the accompanying drawings, I shall now proceed to describe said mechanism in detail.

As stated above, I prefer to describe my improved hydraulic system of control in connection with a milling machine, and in order to more clearly understand the functioning of the hydraulic circuits, etc., I shall first describe in a general way the milling machine structure. Referring to Figures 1 to 4, inclusive, it will be observed that I have shown a milling machine having a main frame or casting 20. Horizontally slidable upon this main frame is a suitable work supporting table 22, the opposite extremities of this table being connected by brackets 24 and 26 to a piston rod 28, which forms a part of a hydraulic table actuator designated generally by the numeral 30 in Figure 4. This actuator includes a cylinder 32 sealed at opposite extremities by suitable stuffing boxes 34 and 36, and an actuator piston 38 positioned intermediate the extremities of the piston rod 28. Thus movement in both directions may be imparted to the table 22 by introducing a fluid propelling medium within the cylinder 32.

The main frame 20 is provided with an upright frame section 20a, and this frame section 20a provides an adjustable support for a spindle headstock designated generally by the numeral 40. The upper portion of the headstock 40 carries an over-arm 42, and depending from this over-arm 42 is a pair of similar arbor supporting arms 44. A main spindle 46 (Figure 1) is rotatably mounted within the headstock 40. The outer extremity of the spindle carries a suitable flywheel 48, and the inner extremity thereof is adapted to receive a conventional cutter arbor 50, this arbor serving to support suitable milling cutters 52 and 53.

Power is supplied to the spindle 46 through a gear on the spindle (for more detailed disclosure see Figure 5 in aforesaid Patent No. 2,099,776), which meshes with a companion bevel gear carried at the upper extremity of a vertical spline shaft 58. The lower extremity of this spline shaft 58 is slidable within and driven by a gear 60 (Figure 2) which is suitably mounted within the machine frame. The gear 60 is rotated in one direction by means of a gear 62, and in the opposite direction through the agency of a similar gear 64, said gears 62 and 64 being mounted within suitable roller bearings 66 and 68, respectively. A shaft 70 extends through the gears 62 and 64 and is provided at its medial portion with a shiftable clutch element 72. When this clutch element 72 is shifted to the left in response to the actuation of a hydraulic actuator 74 (Figure 2), later to be described, a driving connection is established between the shaft 70 and the gear 62, and, when said element is shifted to the right, connection is established between the shaft and the gear 64. Thus the clutch element 72 forms a part of a clutch mechanism which serves to control the direction of rotation of the spline shaft 58 and consequently the direction of rotation of the spindle 46.

Power is supplied to the shaft 70 through a pick-off gear 76 and a companion gear 78 mounted upon one extremity of a second drive shaft 80 (Figure 2). This drive shaft 80 is adapted to be connected with and disconnected from a suitable pulley 82 through the agency of a suitable clutch mechanism 84. This pulley 82 is driven from a suitable prime mover or electric motor 86 (Figure 1), and the clutch mechanism 84 is controlled by means of a hydraulic actuator 88, in a manner later to be described. This actuator 88 is connected by means of the piston rod 90 with a mechanism 92, which is rotatable with the shaft 80 and shiftable longitudinally thereof, the outer extremity of the mechanism 92 being connected with one element of the clutch mechanism 84. Thus when the mechanism 92 is shifted to the right (Figure 2), a driving connection will be established between the pulley 82 and the shaft 80, and, when the device 92 is shifted to the left, the shaft 80 is disconnected from the power supplying pulley 82.

The drive shaft 80 is connected to a second drive shaft 94 by means of gears 96 and 98, and the outer extremity of this shaft 94 is connected by means of a suitable driving gear 324 with a high pressure variable displacement plunger pump, which I have designated generally by the numeral 100. A low pressure variable displacement gear pump 102 (Figure 1) is continuously driven by the prime mover or motor 86. A pump suitable for this purpose is shown in my copending application Serial No. 481,741, filed September 13, 1930, which has since matured into Patent No. 2,178,364. The manner in which these pumps function to effect rapid traverse and feeding movements of the table 22 will be presently described.

Main control valve

Bearing in mind the general structural arrangement of the milling machine as just described, attention is directed to my improved system for hydraulically controlling the rapid traverse movements of the table 22. Referring to the circuit diagram shown in Figure 13 and also to Figures 3 and 5, it will be seen that I employ a main control valve 104. This control valve 104 includes a central casing or section 106, an end section 108, and a similar oppositely disposed end section 110. A valve member 112 is reciprocable within the valve 104 and is capable of occupying three shifted positions. In Figure 13 the valve 112 is shown in its neutral position, and said valve is capable of being shifted to the left and right of said neutral position. The valve member 112 is adapted to be manually shifted through the agency of a suitable control handle 114, which is conveniently positioned at the front of the milling machine, as clearly shown in Figures 1 and 3. The inner extremity of this handle 114 is connected to the lower extremity of a pin 116, and an arm 118 (Figure 13) extending radially and movable with the pin 116, is connected with a pin 120 carried by the valve member 112. Thus the shifting of the valve 112 may be manually controlled by the manipulation of the control handle 114. The automatic shifting of the valve 112 is occasioned through the agency of a pair of radial fingers 122 and 124 carried by the pin 116, and these fingers are adapted to be engaged by companion dogs, for example, dogs 126 and 128, respectively. These dogs are adjustably supported by the table 22 and may be positioned so as to effect the shifting of the main valve 112 at proper predetermined intervals in accordance with the nature of the work to be accomplished by the machine. The end valve section 108 slidably supports a shiftable balancing member 130, later to be described, and the casing section 110 slidably carries a similar balancing member 132. The shifting of these members 130 and 132 is controlled by levers 134 and 136 pivotally supported on the valve casing sections 108 and 110, respectively. Suitable spring-pressed plungers 138 and 140 serve to maintain contact between the lower ends of the levers 134 and 136 and the adjacent outer extremities of the balancing members 130 and 132, as clearly shown in Figure 5.

System of rapid traverse control

It should be noted that the main control valve 104 is connected to the discharge side of the gear pump 102 by a pipe line 142. This pipe line 142 directs low pressure fluid from the gear pump to a central annular valve port 144 (Figures 5 and 13). When the valve member 112 occupies the neutral position shown in Figure 5, the low pressure fluid, which enters the annular port 144, is directed through a radial port 146 in the valve member 112 and a longitudinal passageway 148 into a chamber 150. This chamber 150 is connected with a reservoir 152 by a pipe line 154 and a device 156 having an adjustable restricted orifice. Thus, when the main valve occupies its neutral position, low pressure fluid is circulated therethrough and returned to the reservoir 152 without imparting any movement to the actuator piston 38, and it will be seen that the reservoir 152 is connected to the intake side of the gear pump 102 by a pipe line 157 (Figure 1). The orifice device 156 maintains a back pressure in the circuit as the fluid circulates therethrough.

In this connection attention is directed to a pipe line 158, which communicates at one extremity with the valve chamber 150, and at its opposite extremity with a port 160 of a starting and stopping valve denoted generally by the numeral 162 (Figures 8, 9, and 13). Another pipe line 164 connects the annular valve port 144 with a port 166 of the valve 162. The valve member 162 includes a suitable housing 168 and a valve member 170 which is reciprocable within said housing. Thus it will be apparent that, when the main valve 104 is in its neutral position as described above, the fluid pressure within the valve 162 will be equalized, and the valve member 170 will remain in the position shown in Figure 13. In other words, the fluid pressure in the lines 158 and 164, and consequently the pressure of the fluid acting upon the valve member 170, is equalized, and due to the fact that the area of the valve member 170 acted upon at the right extremity thereof is greater than the cross-sectional area acted upon toward the opposite extremity, said valve member will be retained in the left position shown in Figure 13. In this position low pressure fluid from the pipe line 158 passes through the valve port 160, a valve passage 172, an annular valve port 174, and then into a pipe line 176, which connects with one end of the hydraulic actuator 88. This actuator 88 includes a cylinder 178 and a piston 180, which is connected through the rod 90 with the clutch shifting device 92 (Figure 2). Thus, when the main valve member 112 occupies its neutral position, as shown in Figure 13, the low pressure fluid entering the valve 162 from the pipe line 158 is directed against the actuator piston 180 to urge it to the right as seen in Figure 13, and thereby causes the clutch mechanism 84 to be engaged; that is to say, when the main valve member 112 occupies its neutral position, the valve 162 is automatically positioned so as to effect the movement of the actuator piston 180 to the right, and thereby operatively connect the pulley 82 (Figure 2) with the drive shaft 80.

Consider now that the valve member 112 is shifted to the left so as to direct low pressure fluid from the annular port 144 through lateral ports 182, which are now in communication with a second annular valve port 184 (Figures 5 and 13), radial ports 146 now being closed. This annular port 184 is connected to the right extremity of the actuator cylinder 32 by means of a pipe line 186. The opposite extremity of the cylinder 32 is connected by a pipe line 188 to an annular port 190 of the valve 104, and thus the return fluid passes through this annular port 190 into a valve chamber 192. This valve chamber 192 is connected with the passageway 148 through a radial port 194 (Figure 13). In this manner fluid from the return pipe 188 is returned to the low pressure chamber 150 and thence through the return pipe line 154. Thus when the main valve member 112 occupies its shifted position to the left, the actuator piston 38 and consequently the milling machine table 22 will be urged to the left (Figures 4 and 13).

It should be noted that the instant the main valve member 112 is shifted to the left, the fluid pressure within the annular port 144 is increased, thereby causing increased pressure within the pipe line 164. This causes the automatic shifting of the valve member 170 to the right (Figure 8), and in this position low pressure fluid from the pipe 158 is directed by the valve 162 through a pipe line 204 and into the right end of the actuator cylinder 178. This causes the piston 180 to be shifted to the left, the return fluid from the actuator being delivered to the valve 162 by the pipe 176, thereby effecting the instantaneous disengagement of the main clutch 84. In other words, the instant the actuator piston 38 is subjected to rapid traverse movement, the power supply is disconnected from the shaft 80, and consequently the milling machine spindle 46 is stopped. If the main control valve 112 is shifted to the right, low pressure fluid will be delivered from the pipe line 188 to the left end of the cylinder 32, and thus cause the rapid traverse movement of the piston and the milling machine table to the right. Under such circumstances the valve 170 will be maintained in its shifted position to the right (Figure 8), thereby causing the main control clutch 84 to be disengaged. It should be noted that a pipe line 206 connected to the valve casing 168 serves to return fluid from the valve 162 to the reservoir 152. If it is desired to manually control the movement of the valve member 170, a hand lever 208 may be employed.

It will be apparent that, when the main valve member 112 is again shifted to its neutral position shown in Figure 13, the pressure in the annular port 144 and the chamber 150 will be equalized, and, in view of the fact that there is a greater area to be acted upon by the fluid at the right extremity of the valve 170 than there is at the left thereof, due to the presence of a shifter rod 210, said valve member will be instantaneously shifted to the left, and in this position will cause fluid to be directed through the pipe line 176 so as to operate the actuator piston 180 to the right, and thereby cause the immediate engagement of the clutch mechanism 84. This causes power to be delivered to the milling machine spindle 46. In the event that it is desired to manually control the shifting of the valve member 170, an extension may be formed at the right end of said valve member, said extension having a diameter equal to the diameter of the rod 210. Under such conditions there will be no unbalanced areas to effect the shifting of the valve member when the main control valve 104 is shifted to neutral position.

System of feed control

From the foregoing it will be apparent that, when the valve member 112 is shifted to the left, the actuator piston 38 will be moved at a rapid traverse rate to the left, and that the driving pulley 82 will be disconnected from the drive shaft 80 so as to render the milling machine spindle 46 non-rotatable. Likewise, when the valve member 112 is shifted to the right, the actuator piston 38 will be shifted at a rapid traverse rate to the right.

Attention is now directed to the fact that, when the valve member 112 is shifted, for example, to the left (Figure 13) and fluid is directed from the pipe line 186 into the right end of the actuator cylinder 32, a portion of said low pressure fluid will pass through a pipe line 212 into a port 214 provided in an automatic direction valve designated generally by the numeral 216. This fluid will pass from the port 214 through a passageway 218 into an end chamber 220, thereby causing a valve member 222 to be automatically shifted to the left (Figure 13). Contemporaneously with the shifting of this valve member, the hydraulic actuator 74, which includes a cylinder 224 and a piston 226, functions or shifts to the left as a result of fluid passing from the pipe line 212 through a connecting pipe line 228 into the right end of the cylinder 224. Fluid from the other end of the cylinder 224 is returned through a pipe line 230 which connects with a pipe line 232. The piston 226 is connected by means of a rod 234 with a clutch shifting member 236 (Figure 2). Thus when the element 236 is shifted to the left, a driving connection will be established between the clutch drive shaft 70 and the driven hypoid gear 60 through the agency of the companion driven hypoid gear 62. In this manner the clutch 72 is conditioned to impart rotation in a proper direction to the milling machine spindle the instant that the clutch mechanism 84 is operated to establish driving connection between the pulley 82 and the drive shaft 80.

The plunger pump 100 which is shown diagrammatically in Figure 13, is of a non-reversible type and is adapted to supply fluid under pressure through a discharge pipe line 238, which connects with a port 240 of the direction valve 216. This port 240 communicates with an annular port 242 and, when the valve member 222 is shifted to the left, as shown in Figure 13, it is conditioned to direct high pressure fluid from the port 242 through an annular port 243 into the port 214. Thus it might be stated that the direction valve 216 is operable in response to the fluid from the low pressure or rapid traverse circuit to effect the control of fluid flow within the high pressure circuit. The instant that the main control valve 104 is shifted to neutral position, rotation is automatically imparted to the milling machine spindle 46 from the shaft 80, and power is also supplied to the variable displacement pump 100 which is driven from the same shaft. In other words, the instant that the main control valve is shifted to neutral, the low pressure circuit is rendered functionally inoperative with respect to the actuator piston 38, and the high pressure or feeding circuit, which includes the plunger pump 100, is rendered functionally operative to effect the feeding movement of the actuator piston 38 in a direction the same as the direction in which it was previously advanced by fluid from the low pressure circuit. Fluid from the left end of the actuator cylinder 32 is directed during feed through the pipe line 232 into a valve port 244, which at this instant communicates through an annular port 246 with a passageway 248. This passageway 248 is connected by a pipe line 250 with the intake side of the plunger pump 100.

Consider now that the main control valve 104 has been shifted to the right. In this position low pressure fluid will be directed through the pipe line 232 into the valve port 244, and thence through a passageway 252 into an end chamber 254. This causes the shifting of the valve member 222 to the right, thereby conditioning the high pressure or feeding circuit so as to subsequently cause the actuator piston 38 to be shifted to the right at a feeding rate. A portion of the low pressure fluid from the pipe line 232 passes through the pipe line 230 and into the left end of the cylinder 224 of the spindle reversing actuator 74, and thus causes the gear 64 (Figure 2) to be operatively connected with the drive shaft 70. In other words, the rotation of the milling machine spindle is always in accordance with the direction of movement of the table; that is to say, the instant that the table is shifted in a reverse direction, the rotation of the spindle, if in operation, is correspondingly reversed. From the foregoing it will be apparent that, regardless of the direction of travel of the milling machine table, the spindle rotation may be controlled so as to effect the rotation of the cutters on the arbor 50 against the feed of the table, bringing the force downward on said table.

*Full automatic control*

Assume that a work piece has been placed upon the milling machine table 22, and that the motor 86 is operating so as to continuously drive the gear pump 102, and to impart rotation to the main drive pulley 82 (Figure 2). Assume further that the main control valve occupies the neutral position shown in Figure 5, and that the milling machine table occupies its starting position, as shown in Figures 3, 4, and 5. It should be noted that, when the table is in the position shown in said figures, a dog 256 (Figure 3) engages the shifter rod 210 of the clutch starting and stopping valve 162, and thus maintains the clutch mechanism 84 disengaged so that no power is being delivered to the milling machine spindle or the plunger pump. Upon shifting the control handle 114 and valve member 112 to the left, fluid from the gear pump will be directed from the main control valve 104 to the right end of the actuator cylinder 32 so as to move the table 22 at a rapid traverse rate to the left. The dog 126 carried by the table 22 is so positioned that, when the work supported by the table reaches its companion milling cutter 52 carried by the arbor 50, said dog will engage the radial finger 122 and thereby cause the valve member 112 to be returned to its neutral position thus cutting off the flow of low pressure fluid to the actuator. It should be noted that during the initial rapid traverse movement of the table, the starting and stopping valve 162 is maintained in its shifted position to the right (Figure 8), due to the unbalanced fluid pressure within said valve, and the milling machine spindle is maintained inoperative. The instant that the main control valve is returned to its neutral position, as a result of the engagement of the dog 126 with the finger 122, the valve 162 is automatically shifted to its extreme left position (Figure 13) as described above, thereby causing the engagement of the clutch mechanism 84 so as to impart rotation to the spindle 46 and the driving mechanism of the pump 100. At the same instant the direction control valve 216, which was previously shifted to the left in response to the pressure of the fluid in the low pressure circuit, serves to direct high pressure fluid from the plunger pump 100 into the right end of the actuator cylinder 32, and thus continues the advancement of the milling machine table at a feeding rate. When the cut upon the work piece has been completed, a dog 258 carried by the table 22 engages the lever arm 134, thereby causing the shifting of the balancing member 130 to the right (Figure 5). This establishes communication between a pipe 268 connecting with the reservoir 152 and an end chamber 260 of the control valve 104 through a passageway 262, a radial port 264, and an annular port 266 in the balancing member 130. Thus fluid in the end chamber 260 is relieved against pressure and is free to return to the reservoir 152 through pipe lines 268 and 270 (Figure 13). Relieving fluid pressure within the end chamber 260 causes the valve member 112 to be suddenly shifted to the left, thereby again causing the table 22 to be moved at a rapid traverse rate to the left. The shifting of the valve member 112 by the rapid traverse fluid, as just described, will be more clearly understood by noting in Figure 5 that the valve chamber 150 communicates with the chamber 192 through the longitudinal passage 148 and the radial port 194. When the valve member 112 occupies the neutral position shown in Figure 5, the chamber 192 is further in communication with an end chamber 274 through a longitudinal passage 193 and a passage or channel 195 provided in the end section or housing 110 of the valve structure. The passage 195 communicates with an annular port 197 which is adapted to communicate with the end chamber 274 through an annular recess provided at the inner extremity of the balancing member 132 when the balancing member is in its outward position as shown in Figure 5. A similar arrangement of passageways or channels associated with the opposite extremity of the valve member 112 serves to establish communication between the chamber 150 and the end chamber 260 when the balancing member 130 is in its retracted or outward position. Movement of the balancing member 130 inwardly or to the right cuts off communication between the end chamber 260 and the chamber 150, and simultaneously relieves the fluid pressure within the end chamber 260 through the unrestricted pipe lines 268 and 270, as previously pointed out. The pressure fluid in the end chamber 274 thereupon acts to shift the valve member 112 to the left into traverse position. As the table moves, and the dog 258 moves away from the lever arm 134, a further leftward shifting of the valve member 112 operates to restore the balancing member 130 outwardly or to the left sufficient to re-establish communication between the chambers 150 and 260, the introduction of the pressure fluid into the chamber 260 thereupon acting to fully restore the balancing member to normal outward position. When the table has reached a predetermined position, a dog 272 (Figures 3 and 5) is moved into engagement with the lower end of the lever 136, thereby causing the balancing member 132 to be shifted to the left (Figure 5). Fluid within an end chamber 274 of the valve is now free to flow through a longitudinal passage 276, a radial port 278, an annular port 280, and a pipe line 282, which connects with the return pipe line 270 (Figure 13). In this manner the fluid pressure within the valve 104 is unbalanced, and the valve member 112 immediately and suddenly shifts to the right, thereby causing a reversal in a rapid traverse movement of the table 22. The balancing member 132 functions similarly to the balancing member 130, as previously described. From the foregoing description it will be clear that, upon the reversal of the table movement, the hydraulic actuator 74 operates to condition the reversal of rotation of the spindle 46 when it is again set into operation, and the valve member 222 of the direction control valve 216 is shifted to the right and is thereby conditioned to connect the plunger pump 100 to the left side of the actuator cylinder 32, when said pump is again rendered functionally operative. The dog 128 is eventually moved into engagement with the radial finger 124, which has now been swung to its uppermost position, and this causes the valve member 112 to be shifted to its neutral position. The engagement of the dog 128 with the finger 124 may be timed so as to take place just as the milling cutter 53 engages a second work piece carried by the table 22. A feeding movement is imparted to the table until a dog 284 is moved into engagement with the upper end of the lever 136. This causes the unbalancing of the valve 104, thereby effecting the sudden shifting thereof to the right so as to again subject the table 22 to rapid traverse movement in the same direction, and the immediate stopping of the milling machine spindle. As the table reaches the limit of its rearward movement, a dog 286 is moved into engagement with the finger 124, thereby shifting the main control valve to neutral position so as to arrest the movement of the table 22. Contemporaneously with the stopping of the table 22, the dog 256 engages the rod 210 of the starting and stopping valve, thereby preventing the shifting of the valve 170 to the left when the main valve is shifted to its neutral position. The machine spindle and feed pump thus remain inoperative. In this manner a complete automatic reciprocation of the table is effected, it being only necessary for the operator to shift the main control handle 114 to the left in order to initiate the cycle of operation.

It should be noted that I also disclose another dog 288 (Figure 3), which may be employed in the event that a continuous repeated reciprocation of the table 22 is desired. This dog 288 is adapted, when the table reaches the limit of its rearward movement, to engage the lower end of the lever arm 134, thereby unbalancing the main valve and effecting the automatic reversal of the table. When this dog 288 is employed, the dog 256 may be shifted to an inoperative position, and when the dog 256 is used, the dog 288 may be shifted to an inoperative position, as shown in the drawings. It should be understood that my invention is in no sense limited to the specific arrangement of the dogs, nor to the particular number of dogs shown in the drawings. In Figure 14 I have shown a diagrammatic representation of the cycle of operation just described, but it should be clearly understood that numerous other cycles of operation of the machine may be obtained by a mere rearrangement of the dogs on the table. The cycle of operation which I have described may be referred to as one which permits intermittent movement in both directions of the table, all of said movements being automatically and positively controlled.

Attention is directed to vents or restricted openings connected to the ports 290 and 292 provided in the automatic direction control valve 216 (Figure 13). These vents communicate through a pipe line 294 with the return line 154 of the low pressure circuit and connect at their inner extremities with annular passages or ports 296 and 298 in the valve housing. These annular ports 296 and 298 are arranged to communicate, respectively, with the lateral ports 246 and 243 of the valve member 222 through valve member passageways 300 and 302 when the valve member is shifted to one or the other of its operating positions. Thus, when the valve member 222 occupies the position shown in Figure 13, low pressure fluid supply communicates through passage 300 with the low pressure side of the feed pump circuit so as to take care of any leakage within the stuffing box 34. When the valve member 222 is shifted to the right, the low pressure fluid supply is connected through passage 302 with the low pressure side of the feed pump fluid circuit, and thereby takes care of any leakage which might result from the wear in the stuffing box 36.

*High pressure plunger pump*

While this invention does not relate to the specific types of pumps employed for effecting the shifting of the table 22, these pumps enter into the general combination which brings about the shifting of the table, and the inherent structural features of the plunger pump 100 enter into said combination so as to render the functioning of the fluid circuits very efficient. This plunger pump 100 is similar to the pump disclosed in my copending application Serial No. 481,741, filed September 13, 1930, which has since matured into Patent 2,178,364. A detailed description of this plunger pump is not essential to a clear understanding of the present invention, but certain of the structural features thereof are of great importance in connection with the functioning of the feeding circuit just described. This pump 100 (Figures 10 to 12, inclusive, includes a stationary support or casing 304, which supports a plurality of radially disposed reciprocable pistons 306. The outer ends of the chambers in which these pistons are reciprocable communicate with inclined radial passageways 308. Reciprocation is imparted to the pistons 306 through the agency of an eccentrically adjustable driving ring 310, which is mounted on an anti-friction bearing 312. This bearing 312 is carried on the cylindrical portion of a rotary driving member 314. This driving member 314 is formed with a block or section 316, which is slidably dovetailed within a rotary driving sleeve 318. This driving sleeve 318 is rotatable within a suitable bearing 320 carried by an end casing 322, and rotation is imparted to the sleeve 318 by means of a gear 324, which meshes with companion gear teeth provided along the peripheral surface of a flange 318a of the sleeve 318.

Lateral adjustment of the driving member 314 with respect to its driving sleeve 318 is effected by means of a cylindrical adjusting member 326. The inner extremity of this member 326 carries an eccentrically positioned projection 328 which is adapted to be received by a companion slot 330 in the section 316 of the driving member 314. Thus, when rotation is imparted to the member 326 by applying a suitable wrench (not shown) to the outer squared end thereof, the driving member 314 will be shifted transversely so as to vary the eccentricity of the driving ring 310 with respect to the axis of rotation of the driving sleeve 318. In other words, by rotating the member 326, the stroke of the pistons will be varied. A nut 332 is adapted to secure the adjusting member 326 in any fixed shifted position. The driving member 314 is provided with a tongue 334 which extends into a companion groove 336, provided in one end of a rotary valve member 338.

This rotary valve 338 is tapered and the large end thereof is positioned adjacent the driving member 314. A tapered bushing or bearing 340 provides a mounting for the tapered valve 338, and the outer extremity of said valve member is provided with a threaded extension 338a. A clamping ring 342 mounted upon the threaded end 338a serves to clamp an anti-friction thrust bearing 344 in position. The threaded end 338a of the valve member is split so that, when a screw 346 carried by the valve end is tightened within the valve member, the threaded end 338a will be sprung outwardly so as to lock the clamping ring 342 in position. With this construction it will be apparent that the valve member 338 may be longitudinally adjusted and positively secured in its adjusted position.

From the foregoing it will be apparent that the driving member 314 rotates in unison with the tapered valve member 338, and that during this rotation reciprocation is experienced by the pistons 306, in the event that the driving ring 310 is eccentrically positioned, as shown in Figure 11. In this connection it might be stated that pivoted fingers 348 mounted on the casing 304 and having their ends interposed between the driving ring and the pistons are employed to prevent the subjection of the pistons or plungers 306 to any undue side thrust. Fluid is introduced to the pump 100 through the pipe 250 (Figure 13), which communicates with an end chamber 350.

Fluid from this chamber 350 passes through passages 352 provided in the screw 346, and thence into a central valve passage 354. This central valve passage communicates with a port 356 extending part way around the periphery of the valve member, and thus low pressure fluid from the passage 354 is directed to the passageways 308, which successively register with the peripheral port 356. During this registration of the passageways 308 with the port 356, the plungers 306 companion thereto are experiencing their inward or intake stroke. During the outward or compressing stroke of these plungers, fluid is directed out of said passageways through a port 358 also extending partially around the periphery of the valve. This port 358 communicates through a passageway 360 with an annular port 362, and this annular port is continuously in communication with the discharge pipe 238.

The tapered arrangement of the valve member 338 prevents leakage of fluid longitudinally thereof to the right (Figures 10 and 12). Should any fluid be present along the periphery of the tapered valve member at the larger end thereof, an annular passage 364 will convey said fluid through a communicating passage 366, which terminates at its inner extremity within the valve passage 354. By employing the screw 346 and the associated clamping ring 342 in the described manner, I am able to positively secure the valve member against displacement toward its larger end in the event that high fluid pressures are developed which would urge the valve in that direction. By employing this construction, said valve member may be subjected to high pressure fluid conditions at either extremity without the slightest possibility of binding. Also, said valve may be accurately adjusted to provide the proper fluid film between the peripheral surface thereof and its bearing for lubrication purposes. By using a high pressure plunger pump, such as the pump 100 which is equipped with a stationary housing or support and a tapered valve construction as described, I am able to connect said pump within a closed hydraulic circuit, which includes the actuator cylinder 32, pipe lines 212 and 232, and the direction control valve 216.

*Summary*

From the foregoing it will be apparent that my invention contemplates the provision of a hydraulic system of control, which is broadly applicable for controlling the shifting of elements, such as machine parts and the like. It will also be apparent that my improved circuit arrangement enables the functioning of the feeding or high pressure circuit to be controlled in response to the functioning of the low pressure or rapid traverse circuit. In other words, the fluid pressure or flow of fluid within the low pressure circuit causes the actuation of the direction control valve 216, and this valve in turn conditions the feeding circuit so that, when the plunger pump is subsequently actuated, said pump will deliver fluid at high pressure to the hydraulic actuator for propelling the table in the desired direction. The described system of controlling the high pressure and low pressure circuits should be clearly distinguished from systems which have been employed heretofore, for example, systems which have employed five-position valves. In such conventional systems of control the five-position valve is continually maintained in connection with both the low and high pressure fluid, and in order to change said actuator from low pressure to high pressure control, or vice-versa, said five-position valve must be shifted past ports in such a manner that the stuttering or non-uniform movement of the actuator cannot be avoided. In other words, as said five-position valve is shifted from one position to another, a relatively slow change from low to high pressure operating conditions takes place, and during this interval the feeding circuit is subjected to pulsations or non-uniform pressure conditions, which seriously impair the functioning of a cutter which is being used upon the work piece. My invention provides a system whereby a change from low to high pressure fluid conditions, or vice-versa, may be obtained without the slightest possibility of experiencing pulsations or non-uniform operating conditions within the feeding circuits. In this connection it should be noted that my low pressure circuit operates independently of the high pressure circuit, and the high pressure or feeding circuit operates independently of said low pressure or rapid traverse circuit. In fact, the two circuits are never operatively connected. Furthermore, the sudden shifting of my control valves positively precludes the introduction of any pulsating effect. It should be noted that my improved direction control valve operates instantaneously and simultaneously with the shifting of the main control valve, and that the instant that the main control valve is shifted to neutral, the independently operable feeding circuit is rendered functionally operative. My improved arrangement of fluid circuits enables absolute uniform operating conditions, which conditions are not only superior to conditions which have been obtained heretofore by the use of hydraulic systems of control, but also are far superior to mechanical feeding devices.

My invention is by no means limited for use in connection with milling machines, but is capable of application in any instance where it is desirable to impart uniform movement to a shiftable element, to control the variation in rate of travel of said element, and to control the direction of movement thereof. My improved value mechanism for controlling the starting and stopping of the spindle provides a very unique and effective means, which is of extremely simple construction. In fact, all of the control devices which I have described may be manufactured by the practice of conventional machine shop methods and serve to eliminate the necessity of employing complicated and numerous mechanical devices which have been used heretofore in controlling the movement of machine elements, such as milling machine tables and the like. In fact, my invention enables such machine elements to be hydraulically controlled with the use of a minimum number of machine parts, and with a minimum amount of skill and effort on the part of an operator.

While I have disclosed a particular type of plunger pump construction, it will be understood that other pump constructions may be employed, and in this connection I wish to refer to the type of pump disclosed in my Patent No. 1,989,117. In that patent I have shown a plunger pump which may be adjusted without first stopping the pump. In other words, the stroke of the pistons may be adjusted during the functioning of the pump, and this construction is particularly convenient when it is desired to control fluid displacement to vary the speed of operation of the propelled devices during the operation of the machine with which the plunger pump is connected. Forms of gear pumps other than the form shown in the drawings may be employed, for example, the pumps disclosed in my Patent No. 1,912,737 and Patent No. 1,912,738. Gear pumps of this type are adapted for continuous operation without subjecting the fluid to heating. Subjection of the fluid medium to excessive heat is one of the serious problems which has confronted manufacturers. When fluid, such as oil, is subjected to excessive heat, considerable difficulty results from leakage and the like. It should be noted that my gear pump may be adjusted independently of the displacement of the plunger pump.

Should it be desirable in certain instances to allow fluid to flow from the pipe line 154 through the pipe line 294 (Figure 13) only when leakage takes place, for example, leakage in the stuffing boxes 34 and 36, a suitable valve (not shown) may be employed for this purpose. In this connection reference is made to the type of valve shown in my Patent No. 2,078,696. By having the reservoir 152 and its associated parts properly positioned, I am able to positively eliminate the presence of air in the fluid circuit, and this obviously makes for uniform propulsion of the shiftable machine elements.

Attention is also directed to the fact that my plunger pump 100 is of the type which is automatically rendered functionally inoperative when the fluid actuator is subjected to sudden stoppage, for example, when a metal-to-metal abutment is experienced by the milling machine table so as to positively prevent further forward movement thereof. In such instances the pistons of the plunger pump are automatically urged outwardly so that, as the driving ring 310 sweeps past the pistons, no reciprocation is experienced thereby. As soon as the abutment or obstacle is removed and the table is free to be shifted, the pump is automatically rendered functionally operative. For a more detailed description of the functional characteristics of this pump, reference is made to my Patent No. 2,078,695.

It is obvious that various changes may be made in the specific embodiments set forth for purposes of illustration without departing from the spirit of the invention. Accordingly the invention is not to be limited to the specific embodiments shown, but only as indicated in the following claims.

Having thus described my invention, what I claim as new and desire to secure by Letters Patent is:

1. In a hydraulic system of control, a hydraulic actuator, means for supplying fluid at a relatively high rate to said actuator, said means comprising fluid pressure generating means, a fluid circuit connecting said fluid pressure generating means to said actuator, and means in said circuit for controlling the direction of flow of fluid in said circuit to supply and discharge fluid to and from said actuator in one direction or selectively in an opposite direction to effect relatively rapid traverse movements of said actuator selectively in opposite directions, means comprising a second fluid pressure generating means and a second fluid circuit connecting said second fluid pressure generating means to said actuator for supplying fluid at a relatively slow rate to said actuator, and a reversible direction valve in said second circuit preset by fluid flow in the first circuit for controlling the direction of flow of fluid in said second circuit to supply and discharge fluid to and from said actuator in one direction or selectively in an opposite direction thereby to effect relatively slow traverse movements of said actuator selectively in opposite directions determined by the direction of flow of fluid in the first circuit.

2. In a hydraulic system of control, a hydraulic actuator, means for supplying fluid at a relatively high rate to said actuator, said means comprising fluid pressure generating means, a fluid circuit connecting said fluid pressure generating means to said actuator, and means in said circuit for controlling the direction of flow of fluid in said circuit to supply and discharge fluid to and from said actuator in one direction or selectively in an opposite direction to effect relatively rapid traverse movements of said actuator selectively in opposite directions, means comprising a second fluid pressure generating means and a second fluid circuit connecting said second fluid pressure generating means to said actuator for supplying fluid at a relatively slow rate to said actuator, fluid actuated valve means for controlling the direction of flow of fluid in said second circuit to supply and discharge fluid to and from said actuator in one direction or selectively in an opposite direction to effect relatively slow traverse movements of said actuator selectively in opposite directions, and means for supplying fluid from the first circuit to said valve means for actuating said valve means in response to fluid flow in the first circuit.

3. In a hydraulic actuator system for moving machine parts and the like, a fluid motor for effecting movement of the machine part, means comprising a first fluid pressure generating means, a rapid traverse fluid circuit connecting said first fluid pressure generating means to said motor and means for controlling the direction of flow of fluid in said circuit to and from the motor for effecting relatively rapid traverse movements of said motor selectively in opposite directions, said direction controlling means including valve mechanism selectively operable to permit or block delivery of fluid from said first fluid pressure generating means to said motor, means comprising a second fluid pressure generating means, a second fluid circuit connecting said second fluid pressure generating means to said fluid motor, and means presettable under the control of said first mentioned direction controlling means for controlling the direction of flow of fluid in said second circuit for supplying fluid at a relatively high fluid pressure and at a relatively low constant volumetric rate to effect slow traverse movements of said actuator selectively in opposite directions, and means operable under the control of said valve mechanism to render said second fluid pressure generating means selectively effective or ineffective as said valve mechanism blocks or permits delivery of fluid to said motor through said first circuit.

4. In a hydraulic system of control, a hydraulic actuator, means for supplying fluid at a relatively high rate to said actuator, said means comprising fluid pressure generating means, a fluid circuit connecting said fluid pressure generating means to said actuator, and means in said circuit for controlling the direction of flow of fluid in said circuit to supply and discharge fluid to and from said actuator in one direction or selectively in an opposite direction to effect relatively rapid traverse movements of said actuator selectively in opposite directions, means comprising a second fluid pressure generating means and a second fluid circuit for connecting said second fluid pressure generating means to said actuator for supplying fluid at a relatively slow rate to said actuator, and means directly actuated by fluid in at least one of said circuits for selectively connecting one side or the other side of the actuator with the high pressure side of said second fluid circuit.

5. In a hydraulic system of control, a fluid motor comprising a cylinder and piston for effecting movement of a machine part or the like, means for forcing fluid into said cylinder at one side of said piston and discharging it from the other and conversely, at a relatively slow rate to effect relatively slow traverse movements of said motor in opposite directions, said means comprising a first fluid pressure generating means and a slow traverse fluid circuit connecting said first fluid pressure generating means to said cylinder and means for controlling the direction of flow of fluid in said circuit to and from said cylinder on opposite sides of said piston, and means for forcing fluid into said cylinder at one side of said piston and discharging it from the other end conversely, at a relatively high rate to effect relatively rapid traverse movements of said motor, and means including a valve mechanism automatically operable upon operation of said direction controlling means for supplying fluid to the selected low pressure side of the cylinder in said slow traverse circuit to compensate for leakage in said fluid motor.

6. In a hydraulic actuator system of control, a fluid motor comprising a cylinder and a piston, a first means for supplying fluid into said cylinder at one side of said piston and discharging it from the other and conversely, at a relatively slow rate to effect relatively slow traverse movements of said motor in opposite directions, a second means for supplying fluid into said cylinder at one side of said piston and discharging it from the other and conversely, at a relatively rapid rate to effect relatively rapid traverse movements of said fluid motor in opposite directions, said second means including valve mechanism for selectively blocking supply of fluid at said rapid rate to said fluid motor, and said first means including valve means shiftable before the supply of fluid at the relatively rapid rate is blocked for controlling the direction of flow of fluid delivered to said fluid motor at said relatively slow rate.

7. In a hydraulic system of control, a fluid motor for shifting machine parts and the like, fluid pressure generating mechanism, a hydraulic circuit connecting said fluid pressure generating mechanism to said motor for effecting the shifting of said fluid motor, a main valve in said circuit for controlling the delivery of fluid from said fluid pressure generating mechanism to said fluid motor, said valve being normally maintained in balance by the fluid pressure in said circuit, and means positioned at opposite extremities of said valve for selectively causing an unbalance of fluid pressure within said valve to automatically effect shifting of said valve in opposite directions.

8. In a hydraulic actuator system for moving machine parts and the like, a fluid motor, a fluid circuit for imparting relatively slow traverse to said motor in opposite directions, including fluid pressure generating mechanism having a plurality of shiftable fluid pressure generating elements, and a valve having inlet and outlet ports for controlling the delivery of fluid toward and away from said pressure generating elements, said valve being tapered to prevent fluid slippage within said mechanism between the high and low pressure sides of said mechanism, a second fluid circuit including fluid pressure generating mechanism for effecting relatively rapid traverse of said fluid motor in opposite directions, valve mechanism for blocking the delivery of fluid from said rapid traverse circuit to said fluid motor during the propulsion of said motor by the slow traverse circuit, and means for restricting communication between the discharge side of the pressure generating mechanism in the rapid traverse circuit and the intake side of the fluid pressure generating mechanism in the slow traverse circuit.

9. In a hydraulic actuator system for moving machine parts and the like, a fluid motor comprising a cylinder and a piston, a first means for supplying fluid into said cylinder at one side of said piston and discharging it from the other and conversely, at a relatively slow rate to effect relatively slow traverse movements of said fluid motor in opposite directions, said means including a fluid pressure generating mechanism, driving means for said fluid pressure generating mechanism, a second means for supplying fluid into said cylinder at one side of said piston and discharging it from the other and conversely, at a relatively rapid rate to effect relatively rapid traverse movements of said fluid motor in opposite directions, coupling mechanism for connecting and disconnecting said driving means and said slow traverse fluid pressure generating mechanism, and means operable in response to the actuation of said motor by said second means for controlling the functioning of said coupling mechanism.

10. In a hydraulic actuator system for moving machine parts and the like, a fluid motor comprising a cylinder and a piston, a first means including fluid pressure generating mechanism connected with said motor for supplying fluid into said cylinder at one side of said piston and discharging it from the other side and conversely, at a uniform relatively slow rate thereby to effect uniform slow traverse movements of said motor in opposite directions, a second means including a second fluid pressure generating mechanism for supplying fluid into said cylinder at one side of said piston and discharging it from the other side and conversely, at a relatively rapid rate to effect rapid traverse movements of said motor in opposite directions, and hydraulically actuated valve means for blocking the delivery of propelling fluid from the rapid traverse fluid pressure generating mechanism to said fluid motor and for simultaneously connecting said slow traverse fluid pressure generating mechanism with said motor.

11. In a hydraulic actuator system for moving machine parts and the like, a fluid motor including a piston and cylinder construction, fluid pressure generating mechanism for delivering fluid under pressure at a substantially uniform rate into said cylinder at one side of said piston and discharging it from the other side and conversely, and means for directing fluid from the discharging side of said motor to the intake side of said fluid pressure generating mechanism, the volume of fluid from the discharge side of said fluid motor, except for fluid leakage within said fluid motor, being sufficient to charge the intake side of said fluid pressure generating mechanism, said fluid pressure generating mechanism including a plurality of fluid pressure generating members and valve means for controlling the flow of fluid toward and away from said members so as to prevent fluid slippage between the high and low pressure sides of said mechanism, the foregoing circuit arrangement serving to insure uniform fluid delivery by said fluid pressure generating mechanism and consequent uniform movement of said fluid motor.

12. In a hydraulic actuator system for moving machine parts and the like, a fluid motor including a cylinder and piston construction, fluid pressure generating mechanism for delivering fluid to said motor at a uniform relatively slow rate to impart slow traverse to said motor in opposite directions, a second fluid pressure generating mechanism for imparting rapid traverse to said fluid motor in opposite directions, and shiftable valve means for selectively controlling the delivery of fluid from said rapid traverse fluid pressure generating mechanism to said motor, said valve means serving in one shifted position to block the delivery of propelling fluid to said motor from said rapid traverse fluid pressure generating mechanism and in another shifted position to connect said rapid traverse fluid pressure generating mechanism with said fluid motor, the discharge side of said rapid traverse fluid pressure generating mechanism communicating with the intake side of said slow traverse fluid pressure generating mechanism in materially restricted communication during the slow traverse movement of said fluid motor.

13. In a hydraulic actuator system for moving machine parts and the like, a fluid motor including a piston and cylinder construction, fluid pressure generating mechanism for delivering fluid to said motor to impart relatively slow feed movement to said motor, a second fluid pressure generating mechanism for delivering fluid to said motor to impart a rapid traverse movement to said motor, a hydraulic circuit connecting the second fluid pressure generating mechanism to said motor and including a shiftable control valve for controlling the delivery of fluid to said motor from said second fluid pressure generating mechanism, said valve being shiftable to one of three positions, namely, a neutral position, a forward position, and a reverse position, said valve in its neutral position by-passing fluid from said second fluid pressure generating mechanism during the slow feed movement of the fluid motor, said valve in its forward position permitting flow of fluid from said second fluid pressure generating mechanism to said fluid motor in a direction to effect a forward rapid traverse movement of said motor, and said valve in its reverse position permitting the flow of fluid from said second fluid pressure generating mechanism to said motor in a direction to effect a reverse rapid traverse movement of said fluid motor, and control mechanism including an auxiliary fluid motor and means under the control of said valve directing fluid to said auxiliary fluid motor for rendering said first fluid pressure generating mechanism effective or ineffective as said valve moves to or from neutral position.

14. In a hydraulic actuator system for moving machine parts and the like, a fluid motor including a piston and cylinder construction, a first means including a first fluid pressure generating mechanism for supplying fluid into said cylinder at a relatively slow rate to effect a relatively slow traverse movement of said fluid motor, a second means including a second fluid pressure generating mechanism for supplying fluid into said cylinder at a relatively rapid rate to effect a rapid traverse movement of said motor, said second means including a valve housing means and shiftable control valve means, said housing means having a pair of ports communicating with opposite sides of said fluid motor, an inlet port communicating with the discharge side of said second fluid pressure generating mechanism, and an exhaust port, said valve means being shiftable to any one of three positions, namely, a neutral position, a forward position, and a reverse position, said valve means in its neutral position blocking the pair of motor communicating ports and simultaneously connecting said inlet port to said exhaust port for by-passing fluid from the second fluid pressure generating mechanism, said valve means in its forward position connecting a first of said pair of motor communicating ports to said inlet port and the second of said pair of motor communicating ports to said exhaust port to effect a forward rapid traverse movement of the motor, said valve means in its reverse position connecting said first one of said pair of motor communicating ports to said exhaust port and said second of said pair of motor communicating ports to said inlet port to effect a reverse rapid traverse movement of the motor, and means operable when said valve means is in neutral position blocking said pair of motor communicating ports to connect the first fluid pressure generating mechanism to said motor whereby to effect slow traverse movements of said fluid motor.

16. In a hydraulic actuator system for moving machine parts and the like, a fluid motor, a first means including a first fluid pressure generating mechanism for supplying fluid to said motor at a relatively slow rate to effect a relatively slow traverse movement of said motor, a second means including a second fluid pressure generating mechanism for supplying fluid to said motor at a relatively rapid rate to effect a rapid traverse movement of said motor, said second means including a valve housing means and shiftable control valve means therein, said housing means having a pair of ports communicating with opposite sides of said motor, an inlet port communicating with the discharge side of said second fluid pressure generating mechanism, and an exhaust port, said valve means being shiftable to any one of three positions, namely, a forward position, a reverse position, and a neutral position, said valve means in its neutral position blocking the pair of motor communicating ports and simultaneously connecting said inlet port to said exhaust port to by-pass fluid from said second fluid pressure generating mechanism, said valve means in its forward position connecting a first of said pair of motor communicating ports to said inlet port and the second of said motor communicating ports to said exhaust port to effect a forward rapid traverse movement of the motor, said valve means in its reverse position connecting said first one of said pair of motor communicating ports to said exhaust port and said second of said pair of motor communicating ports to said inlet port to effect a reverse rapid traverse movement of the motor, and means for rendering said first fluid pressure generating mechanism effective or ineffective to supply fluid to the motor, said last mentioned means being operably related to said valve means to render the first fluid pressure generating mechanism effective upon movement of the valve means to its neutral position blocking the motor communicating ports and ineffective upon movement of the valve means to its forward or reverse positions.

16. In a hydraulic actuator system for moving machine parts and the like, a fluid motor including a piston and cylinder construction, a first fluid circuit including a first fluid pressure generating mechanism for supplying fluid into said cylinder at one side of said piston and discharging it from the other side and conversely, at a relatively slow rate to effect relatively slow traverse movements of said fluid motor in opposite directions, a second fluid circuit including a second fluid pressure generating mechanism for supplying fluid into said cylinder at one side of said piston and discharging it from the other side and conversely, at a relatively rapid rate to effect rapid traverse movements of said motor in opposite direction, said second circuit including a valve housing means and shiftable control valve means therein, said housing means having a pair of ports communicating with said cylinder on opposite sides of said piston, an inlet port communicating with the discharge side of said second fluid pressure generating mechanism, and an exhaust port, said valve means being shiftable to any one of three positions, namely, a forward position, a reverse position, and a neutral position, said valve means in its neutral position blocking the pair of motor communicating ports and simultaneously connecting said inlet port to said exhaust port for by-passing fluid from said second fluid pressure generating mechanism, said valve means in its forward and reverse positions selectively connecting said inlet and exhaust ports to said motor communicating ports, control means for rendering said first fluid pressure generating mechanism effective or ineffective to supply fluid to the cylinder, said control means being operably related to said valve means to render the first fluid pressure generating mechanism effective or ineffective, respectively, upon movement of the valve means into or from neutral position blocking said motor communicating ports, said first circuit including direction control means operatively connected to said second circuit and operable upon movement of said valve means into forward or reverse position to preset said first circuit for supply of fluid into the cylinder on one side or the opposite side of the piston according to the direction of movement of the piston by said second fluid circuit.

17. In a hydraulic actuator system for moving machine parts and the like, a fluid motor, a first means comprising a first fluid pressure generating mechanism, a fluid circuit connecting said mechanism to said motor and including direction control means for controlling the direction of fluid flow in said circuit to supply and discharge fluid to and from said motor in one direction or selectively in an opposite direction to effect relatively slow traverse movements of said motor selectively in opposite directions, a second means including a second fluid pressure generating mechanism, a fluid circuit connecting said second fluid pressure generating mechanism to said motor and including direction control means for controlling the direction of fluid flow in said last mentioned circuit to supply and discharge fluid to and from said motor in one direction or selectively in an opposite direction to effect relatively rapid traverse movements of said motor selectively in opposite directions, driving mechanism for said first fluid pressure generating mechanism, two position control means in one position rendering said driving mechanism effective and in the second position rendering said driving mechanism ineffective to drive said first fluid pressure generating mechanism, and means controlled by one of said circuits for selectively governing the positioning of said two position control means.

18. In a system of hydraulic control including a fluid motor having an actuator piston, a slow traverse pump, means including a closed hydraulic circuit connecting said pump with said motor on opposite sides of said piston for supplying fluid from said slow traverse pump to said motor at one side of said piston and returning it from the other side to said pump and conversely, to effect movement of said motor at slow traverse rates in opposite directions, a rapid traverse pump, means connecting said rapid traverse pump with said motor on opposite sides of said piston for supplying fluid from said rapid traverse pump to said motor at one side of said piston and discharging it from the other and conversely, to move said motor at rapid traverse rates in opposite directions, said last mentioned connecting means including a shiftable valve mechanism for controlling the delivery of fluid from said rapid traverse pump to said fluid motor, said valve mechanism having ports which when uncovered serve to connect the rapid traverse pump with the fluid motor and when blocked to enable the slow traverse pump to operate in said closed circuit, and means including a restricted orifice discharging into the closed circuit between the exhaust side of the motor and the inlet of the slow traverse pump for compensating for any fluid leakage from the fluid motor.

19. In a hydraulic system of control, a hydraulic actuator, means for supplying fluid at a relatively high rate to said actuator, said means comprising fluid pressure generating means, a fluid circuit connecting said fluid pressure generating means to said actuator, and means in said circuit for controlling the direction of flow of fluid in said circuit to supply and discharge fluid to and from said actuator in one direction or selectively in an opposite direction to effect relatively rapid traverse movements of said actuator selectively in opposite directions, means comprising a second fluid pressure generating means and a second fluid circuit connecting said second fluid pressure generating means to said actuator for supplying fluid at a relatively slow rate to said actuator, fluid actuated valve means for controlling the direction of flow of fluid in said second circuit to supply and discharge fluid to and from said actuator in one direction or selectively in an opposite direction to effect relatively slow traverse movements of said actuator selectively in opposite directions, and means for actuating said valve means by the pressure of the fluid in one of said circuits.

20. In a hydraulic actuator system for controlling the movements of machine parts and the like, a fluid motor including a piston and cylinder construction, slow traverse pumping means for supplying fluid to said cylinder at one side of said piston and discharging it from the other and conversely, to effect slow traverse movements of said fluid motor in opposite directions, rapid traverse pumping means for supplying fluid to said cylinder on one side of said piston and discharging it from the other and conversely, to effect rapid traverse movements of said fluid motor in opposite directions, a control valve mechanism including a valve member shiftable within a valve housing, ports in said valve mechanism connecting the rapid traverse pumping means with the fluid motor when the valve member occupies a position establishing communication between said ports, and a closed circuit including fluid ducts connecting said fluid motor with said slow traverse pumping means, the breaking of communication between said ports by said valve member disconnecting said rapid traverse pumping means from the fluid motor, and fluid pressure actuated means operable simultaneously with said valve member for rendering said slow traverse pumping means effective to circulate fluid within said closed circuit upon disconnecting of said rapid traverse pumping means from the fluid motor, said valve mechanism including another port with which communication is established from the port connected to the rapid traverse pumping means for by-passing fluid discharged by the rapid traverse pumping means when communication between the first-mentioned ports is broken.

21. In a hydraulic system of control, a fluid motor comprising a cylinder and piston, a slow traverse pump, a closed hydraulic circuit including sealed ducts connecting said pump with said cylinder on opposite sides of said piston for supplying fluid from said slow traverse pump to said cylinder at one side of said piston and returning it from the other side to said pump and conversely, to effect movement of said motor at slow traverse rates in opposite directions, a rapid traverse pump, means connecting said rapid traverse pump with said cylinder on opposite sides of said piston for supplying fluid from said rapid traverse pump to said cylinder at one side of said piston and discharging it from the other and conversely, to effect movement of the motor at rapid traverse rates in opposite directions, said connecting means including shiftable control valve means for controlling the delivery of fluid to said cylinder from said rapid traverse pump, said valve means being shiftable to any one of three control positions, namely, a neutral position rendering said rapid traverse pump ineffective to supply fluid to the cylinder, a forward position permitting flow of fluid from said rapid traverse pump to said cylinder on one side of said piston, and a reverse position permitting flow of fluid from said rapid traverse pump to said cylinder on the opposite side of said piston, means for shifting said valve means, means for controlling the operation of said slow traverse pump in said closed circuit, and an auxiliary fluid motor for reversibly actuating said last mentioned controlling means, said auxiliary fluid motor being operable simultaneously with said valve means under the control of said valve shifting means.

22. In a hydraulic actuator system, a fluid motor comprising a cylinder and a piston, a prime mover, a variable displacement metering pump comprising a pump cylinder, a pump piston reciprocable in said pump cylinder, and means driven by the prime mover for imparting an exhaust stroke only to said pump piston and limiting the intake stroke thereof at all displacement, a reversing valve, and ducts connecting said motor cylinder on opposite sides of its piston to said valve and said valve to the intake and discharge sides of said pump for directing fluid under pressure escaping from said motor cylinder on one side of its piston to the intake side of said pump to impart an intake stroke to the pump piston and directing fluid under higher pressure from the discharge side of said pump to said motor cylinder on the opposite side of the motor piston.

ERNEST J. SVENSON.